United States Patent Office 3,406,169
Patented Oct. 15, 1968

3,406,169
METHOD OF PREPARING WATER INSOLUBLE FLUORESCENT TRIAZOLYLSTILBENE BRIGHTENERS
Anthony J. Cofrancesco, Albany, N.Y., assignor to GAF Corporation, a corporation of Delaware
No Drawing. Filed Oct. 13, 1964, Ser. No. 403,626
12 Claims. (Cl. 260—240)

ABSTRACT OF THE DISCLOSURE

An improved process of preparing water insoluble fluorescent triazolyl stilbene brighteners is provided by dissolving an o-aminoazo dyestuff in a sufficient quantity of a liquid mono aryl nitro compound to yield a workable solution. To the solution a catalytic amount of metallic powder such as copper, cobalt, nickel, iron, zinc or manganese is added and the solution refluxed at about 100°–110° C. for two to five hours. The resulting brightener product, triazolyl stilbene compound, is isolated by filtration in a yield up to about 80% and of a high degree of purity.

---

This invention relates to an improved method of preparing water insoluble fluorescent triazolyl stilbene brighteners and particularly to a method of ring closing an o-aminoazo compound to yield a fluorescent triazolyl stilbene brightener compound which is free from solubilizing carboxylic and sulfonic groups.

According to the usual method of producing stilbene triazole fluorescent compounds a 4-aminostilbene compound is diazotized and coupled with an amino substituted compound, coupling occurring in the position vicinal to the amine substituent. This intermediary o-aminoazo compound is then oxidized to the triazolyl stilbene compound in the customary manner.

Those o-aminoazo dyestuffs which are insoluble in water are generally oxidized advantageously in organic solvents which are stable to oxidation and which can be mixed with water. Pyridine or picoline are the solvents which are usually employed. The oxidizing agents which are usually employed are alkali hypohalites, alkali chromates, or in most cases cupric salts.

When pyridine or picoline is used as solvent, it is necessary to recover the solvent. Cupric salt is employed in the theoretical amount necessary to oxidize the o-aminoazo dye. Due to the cost of the cupric salt and the difficulty of recovering the solvent this is an expensive step and contributes considerably to the cost of the product. Furthermore, in carrying out the reaction the unpleasant odor of pyridine is present.

It is the principal object of the present invention to provide an improved process of ring closing o-aminoazo dyestuffs devoid of solubilizing carboxylic and sulfonic groups to give yields of from about 70% up to about 80% of a fluorescent triazolyl stilbene brightener.

Other objects and advantages will become manifest from the following description.

The foregoing objects are accomplished by dissolving an o-aminoazo dyestuff in a sufficient quantity of an aryl nitro compound such as nitrobenzene or nitrotoluene to yield a workable solution. To the solution a catalytic amount of metallic powder such as copper, cobalt, nickel, iron, zinc or manganese is added and the solution refluxed at about 100°–110° C. for a period of time ranging from two to five hours. Thereafter, the triazolyl stilbene compound is isolated by filtering, the product being obtained in excellent yield (up to about 80%) and in a high degree of purity. The solvent can be readily purified by distillation.

The o-aminoazo dyestuffs which are ring closed in accordance with the process of the present information are characterized by the following general formula:

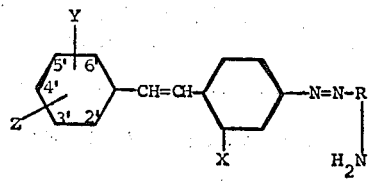

wherein Y may be hydrogen, chloro or lower alkoxy of from one to 3 carbon atoms, X and Z may be hydrogen or a non-chromophoric, non-carboxylic or non-sulfonic acid substituent such as halogen, i.e., bromo, chloro, fluoro; hydroxy, lower alkoxy such as methoxy, ethoxy or propoxy, lower alkyl, such as methyl, ethyl or propyl, cyano, carbamyl, sulfamyl, or a mono- or di-alkyl carbamyl or sulfamyl wherein the alkyl group contains from 1 to 3 carbon atoms, acylamido such as acetamido and benzoylamido; sulfonyl, such as alkylsulfonyl of from 1 to 3 carbon atoms, phenylsulfonyl, morpholinosulfonyl and piperidinosulfonyl, carbalkoxy such as carbomethoxy, carbethoxy or carbopropoxy, and wherein R represents an aromatic carbocyclic radical containing not more than three condensed rings such as phenylene ($C_6H_4=$), naphthylene ($C_{10}H_6=$) or acenaphthylene ($C_{12}H_4=$) which may be unsubstituted or substituted by one or two substituents of the type of X and Z, and may additionally be substituted by a methylenedioxy radical substituted in the 5 and 6 positions, and wherein the $NH_2$ group is ortho to the azo linkage.

The dyestuff art is replete with numerous specific o-aminoazo dyes falling within the configuration of the above formula. Hence, no difficulty will be encountered in selecting the appropriate o-aminoazo dyes for ring closure in accordance with the process of the present invention.

Nitrobenzene and nitrotoluene are the preferred solvents since they are readily available and inexpensive, but any inert aryl nitro compound may be employed, such as chloronitrobenzene, chloronitrotoluene, etc. The amount of solvent employed may vary greatly from the minimum which will dissolve the o-aminoazo dyestuff to about 10 times the amount of dye.

The catalytic amount of metallic powder may vary from about 1 to 10 parts of powder per 100 parts of o-aminoazo dyestuff.

The following examples will illustrate the ring-closing procedure of the present invention.

Example 1

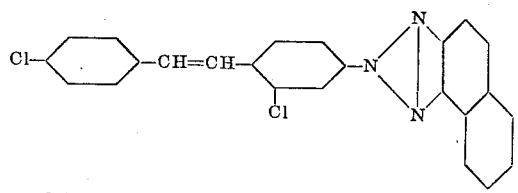

2,4'-dichloro-4-(1,2-naphthotriazo-2-yl)stilbene

To 120 grams of nitrobenzene, containing 1 gram of copper powder, were added 20 grams of 4-(2-amino-1-naphthylazo)-2,4'-dichlorostilbene. The reaction mixture was refluxed at about 100° C. for 4 hours under vigorous agitation. It was then filtered hot to separate the copper. After cooling to room temperature, it was filtered again, and the filter cake washed with cold methanol until the filtrate was almost colorless. Yield 75%.

The following compounds were prepared in the manner of Example 1.

Example:                                        Compound
2 _____ 4-(1,2-naphthotriazol-2-yl)stilbene.

| Example: | Compound |
|---|---|
| 3 | 2-fluoro-4-(1,2-naphthotriazol-2-yl)stilbene. |
| 4 | 2,4'-dimethoxy-4-(1,2-naphthotriazol-2-yl)stilbene. |
| 5 | 2-hydroxy-4-(1,2-naphthotriazol-2-yl)stilbene. |
| 6 | 2-cyano-4-(1,2-naphthotriazol-2-yl)stilbene. |
| 7 | 4'-methyl-4-(1,2-naphthotriazol-2-yl)stilbene. |
| 8 | 2-carbomethoxy-4-(1,2-naphthotriazol-2-yl)stilbene. |
| 9 | 2-carbamyl-4-(1,2-naphthotriazol-2-yl)stilbene. |
| 10 | 2-(diemthylcarbamyl)-4-(1,2-naphthotriazol-2yl)stilbene. |
| 11 | 2-sulfamyl-4-(1,2-naphthotriazol-2-yl)stilbene. |
| 12 | 2-(methylsulfamyl)-4-(1,2-naphthotriazol-2-yl)stilbene. |
| 13 | 4-(5-sulfamyl-1,2-naphthotriazol-2-yl)stilbene. |
| 14 | 4-(5,6-methylenedioxy-1,2-naphthotriazol-2-yl)stilbene. |
| 15 | 2-methylsulfono-4-(1,2-naphthotriazol-2-yl)stilbene. |
| 16 | 2',4'-dichloro-4-(1,2-naphthotriazol-2-yl)stilbene. |
| 17 | 2'-chloro-4-(5,6-dimethoxynapthotriazol-2-yl)stilbene. |
| 18 | 2'-chloro-4-(5,6-methylenedioxy-1,2-naphthotriazol-2-yl)stilbene. |
| 19 | 2'-chloro-4-(5-methoxy-6-methyl-1,2-naphthotriazol-2-yl)stilbene. |
| 20 | 2,4'-dichloro-4-(5,6-methylenedioxy-1,2-naphthotriazol-2-yl)stilbene. |
| 21 | 2,2',4'-trichloro-4-(5,6-dimethoxy-1,2-naphthotriazol-2-yl)stilbene. |
| 22 | 2,2'-dichloro-4-(5-methoxy-6-methyl-1,2-naphthotriazol-2-yl)stilbene. |
| 23 | 2-cyano-4-(5-acetamidobenzotriazol-2-yl)stilbene. |
| 24 | 4'-acetamido-2-cyano-4-(1,2-naphthotriazol-2-yl)-stilbene. |
| 25 | 4'-cyano-4(1,2-naphthotriazol-2-yl)stilbene. |
| 26 | 2-cyano-2'-methoxy-4-(1,2-acenaphthenotriazol-2-yl)stilbene. |
| 27 | 2-(2-chlorophenylsulfonyl)-4-(1,2-acenaphthenotriazol-2-yl)stilbene. |
| 28 | 2-(morpholinosulfonyl)-4-(1,2-acenaphthenotriazol-2-yl)stilbene. |
| 29 | 2-(piperidylsulfonyl)-4-(1,2-naphthotriazol-2-yl)stilbene. |
| 30 | 2'-methylsulfonyl-4-(1,2-naphthotriazol-2-yl)stilbene. |
| 31 | 2-chloro-3',4'-dimethoxy-4-(1,2-naphthotriazol-2-yl)stilbene. |
| 32 | 2-carbopropoxy-4-(1,2-naphthotriazol-2-yl)stilbene. |
| 33 | 2-chloro-4-(5,6-methylenedioxybenzotriazol-2-yl)stilbene. |
| 34 | 2-acetamido-4-(1,2-naphthotriazol-2-yl)stilbene. |
| 35 | 2-benzoylamido-4-(1,2-naphthotriazol-2-yl)stilbene. |

Example 1 was repeated employing different solvents and metallic powders as catalysts as follows:

| Example | Metallic powder | Solvent |
|---|---|---|
| 36 | Co | Nitobenzene. |
| 37 | Fe | Do. |
| 38 | Ni | Do. |
| 39 | Mn | Do. |
| 40 | Zn | Do. |
| 41 | Cu | Nitrotoluene. |
| 42 | Cu | 1-chloro-3-nitrobenzene. |
| 43 | Cu | 1-chloro-2-nitrobenzene. |
| 44 | Cu | 4-chloro-2-nitrotoluene. |

Excellent yields were obtained in all cases.

I claim:

1. A method of preparing water insoluble fluorescent triazolyl stilbene brightener which comprises ring closing an o-aminoazo compound of the formula:

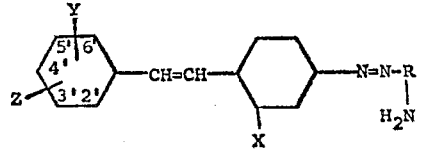

wherein R represents an aromatic carbocyclic radical selected from the class consisting of phenylene, naphthylene and acenaphthylene, X and Z are members selected from the class consisting of hydrogen, halogen, hydroxy, alkyl of from 1 to 3 carbon atoms, alkoxy of from 1 to 3 carbon atoms, cyano, carbalkoxy of from 2 to 4 carbon atoms, carbamyl, mono- and dialkylcarbamyl and mono- and dialkylsulfamyl wherein the alkyl is from 1 to 3 carbon atoms, monoalkyl sulfonyl of from 1 to 3 carbon atoms, phenyl sulfonyl, morpholino-sulfonyl and piperidinosulfonyl, acetamido and benzoylamido, Y represents a member selected from the class consisting of hydrogen, chloro and lower alkoxy of from 1 to 3 carbon atoms, and wherein the $NH_2$ group is ortho to the azo linkage, by refluxing a solution of said o-aminoazo compound in a liquid monocyclic aryl nitro compound selected from the class consisting of nitrobenzene, nitrotoluene, chloro nitrobenzene and chloronitrotoluene in the presence of from about 1 to 10 parts of a catalyst selected from the class consisting of metallic powder of cobalt, copper, iron, nickel, manganese and zinc per 100 parts of said o-aminoazo compound at a temperature of from about 100° C. to 110° C. for a period of time sufficient to ring close the said o-aminoazo compound.

2. A method of preparing water insoluble fluorescent 2,4' - dichloro - 4 -(1,2 - naphthotriazol - 2 - yl)stilbene brightener which comprises ring closing by refluxing 4 - (2 - amino - 1 - naphthylazo) - 2,4' - dichlorostilbene in solution of nitrobenzene in the presence of from about 1 to 10 parts of copper powder as catalyst per 100 parts of said 4 - (2 - amino - 1 - naphthylazo) - 2,4' - dichlorostilbene at a temperature of 100–110° C. for a period of time until ring closure is complete.

3. A method of preparing water insoluble fluorescent 4 - (1,2 - naphtho - triazol - 2 - yl)stilbene brightener which comprises ring closing by refluxing 4 - (2 - amino-1 - naphthylazo)stilbene in solution of nitrobenzene in the presence of from about 1 to 10 parts of copper powder as catalyst per 100 parts of said 4 - (2 - amino - 1 - naphthylazo)stilbene at a temperature of 100–110° C. for a period of time until ring closure is complete.

4. A method of preparing water insoluble fluorescent 2 - carbomethoxy - 4 - (1,2 - naphthotriazol - 2 - yl) stilbene brightener which comprises ring closing by heating 4 - (2 - amino - 1 - naphthylazo) - 2 - carbomethoxy stilbene in solution of nitrobenzene in the presence of from about 1 to 10 parts of copper powder as catalyst per 100 parts of said 4 - (2 - amino - 1 - naphthylazo)- 2 - carbomethoxy stilbene at a temperature of 100–110° C. for a period of time until ring closure is complete.

5. A method of preparing water insoluble fluorescent 2 - sulfamyl - 4 - (1,2 - naphthotriazol - 2 - yl)stilbene brightener which comprises ring closing by refluxing 4- (2 - amino - 1 - naphthylazo) - 2 - sulfamyl stilbene in solution of nitrobenzene in the presence of from about 1 to 10 parts of copper powder as catalyst per 100 parts of said 4 - (2 - amino - 1 - naphthylazo) - 2 - sulfamyl stilbene, at a temperature of 100°–110° C. for a period of time until ring closure is complete.

6. A method of preparing water insoluble 2 - carbamyl-

4 - (1,2 - naphthotriazol - 2 - yl)stilbene brightener which comprises ring closing by refluxing 4 - (2 - amino - 1 - naphthylazo) - 2 - carbamyl stilbene in solution of nitrobenzene in the presence of from about 1 to 10 parts of copper powder as catalyst per 100 parts of said 4 - (2 - amino - 1 - naphthylazo) - stilbene at a temperature of 100°–110° C. for a period of time until ring closure is complete.

7. A method according to claim 1 wherein the catalyst is metallic powder of cobalt.

8. A method according to claim 1 wherein the catalyst is metallic powder of copper.

9. A method according to claim 1 wherein the catalyst is metallic powder of iron.

10. A method according to claim 1 wherein the catalyst is metallic powder of nickel.

11. A method according to claim 1 wherein the catalyst is metallic powder of manganese.

12. A method according to claim 1 wherein the catalyst is metallic powder of zinc.

No references cited.

JOHN D. RANDOLPH, *Primary Examiner.*

H. I. MOATZ, *Assistant Examiner.*